US010220797B2

(12) United States Patent
Newman

(10) Patent No.: US 10,220,797 B2
(45) Date of Patent: Mar. 5, 2019

(54) ANTI-VIBRATION MOUNT FOR AN IN-VEHICLE VIDEO DISPLAY

(71) Applicant: Joseph Newman, Greenwood, IN (US)

(72) Inventor: Joseph Newman, Greenwood, IN (US)

( * ) Notice: Subject to any disclaimer, the term of this patent is extended or adjusted under 35 U.S.C. 154(b) by 0 days.

(21) Appl. No.: 15/360,981

(22) Filed: Nov. 23, 2016

(65) Prior Publication Data
US 2018/0141499 A1 May 24, 2018

(51) Int. Cl.
A47F 1/10 (2006.01)
B60R 11/02 (2006.01)
B60R 11/00 (2006.01)

(52) U.S. Cl.
CPC ... *B60R 11/0235* (2013.01); *B60R 2011/0003* (2013.01); *B60R 2011/008* (2013.01)

(58) Field of Classification Search
USPC .................................................. 248/297.31
See application file for complete search history.

(56) References Cited

U.S. PATENT DOCUMENTS

| 4,363,084 A * | 12/1982 | Dimiceli | B60Q 7/00 362/249.01 |
| 4,523,256 A * | 6/1985 | Small | G03B 15/02 248/125.1 |
| 6,604,722 B1 * | 8/2003 | Tan | F16M 11/10 248/276.1 |
| 6,685,148 B2 * | 2/2004 | Zadok | B65D 83/525 248/177.1 |
| 7,448,584 B2 * | 11/2008 | Chen | F16M 11/10 248/122.1 |
| 7,642,741 B2 * | 1/2010 | Sidman | F16M 11/041 318/638 |
| 7,744,046 B1 * | 6/2010 | Lundy | B60R 11/02 248/121 |
| 7,780,131 B2 * | 8/2010 | Oh | F16M 11/10 248/276.1 |
| 7,854,415 B2 * | 12/2010 | Holbrook | F16M 11/10 248/125.2 |
| 7,891,620 B2 * | 2/2011 | Grabania | F16M 11/08 248/285.1 |
| 8,506,180 B2 * | 8/2013 | Brown | F16M 13/04 248/187.1 |
| 9,062,821 B2 * | 6/2015 | Jensen | F16M 11/041 |
| 2005/0110911 A1 * | 5/2005 | Childrey | F16M 11/10 348/794 |

* cited by examiner

Primary Examiner — Monica E Millner
(74) Attorney, Agent, or Firm — Russ Weinzimmer & Associates, P.C.

(57) ABSTRACT

An anti-vibration mount for an in-vehicle video display is disclosed for supporting a display device inside a moving vehicle so as to allow the display device to be attached to a mounting surface inside the vehicle without use of the mounting holes of the display device. The anti-vibration mount includes a base plate that directly connects to a mounting surface inside the vehicle. A plurality of adjustable support arms connected to the base plate securely hold the display device, and reduce vibration of the display device caused by vibration of the mounting surface in the vehicle.

20 Claims, 6 Drawing Sheets

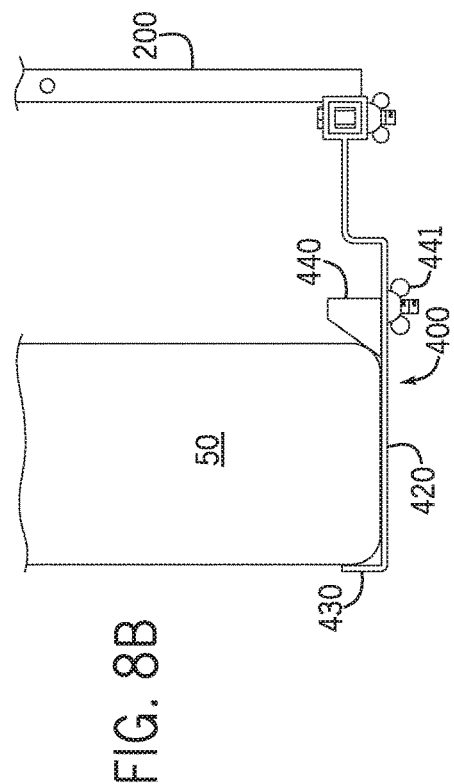
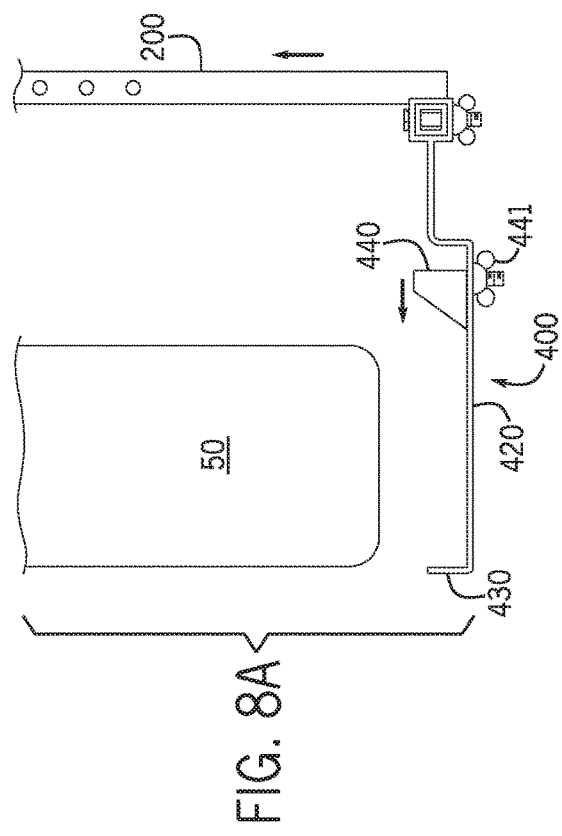
FIG. 8A
FIG. 8B
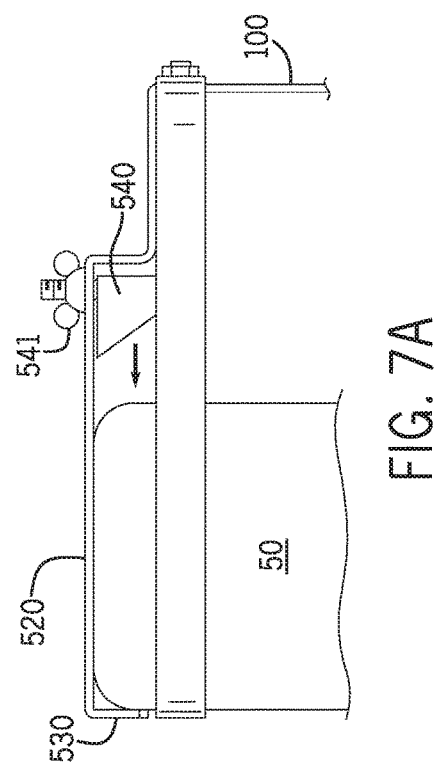
FIG. 7A
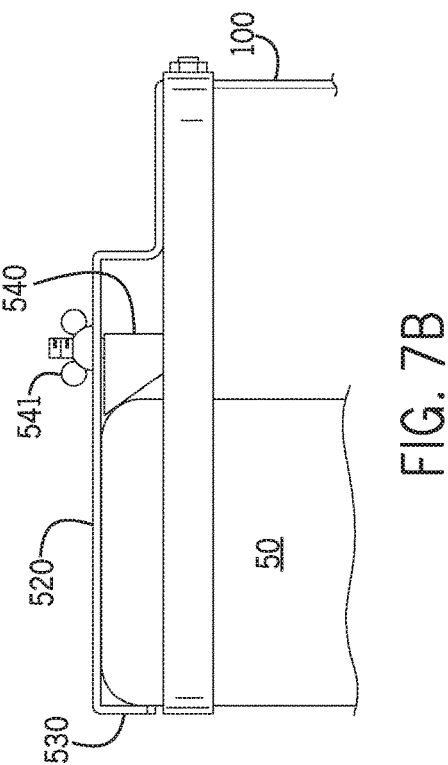
FIG. 7B

ANTI-VIBRATION MOUNT FOR AN IN-VEHICLE VIDEO DISPLAY

FIELD OF INVENTION

This invention generally relates to mountings for video displays, and more particularly to a mount for mounting a video display inside a vehicle.

BACKGROUND

The ever decreasing size of video displays has made their deployment in vehicles a matter of inevitability. Nowadays, video displays are ubiquitous—they can be found in all manners of vehicles such as aircraft, passenger cars, police cars, trucks, vans, and taxicabs. These video displays often use the VESA Mounting Interface Standard (MIS) known colloquially as the VESA mount. The VESA mount is a family of standards defined by the Video Electronics Standards Association for mounting video displays such as flat panel monitors, TVs, and other displays to stands or wall mounts. It is implemented on most modern flat-panel monitors and TVs. Most sizes of VESA mount have four screw-holes arranged in a square on the mount, with matching mounting screw holes in the video display. While the VESA mount works to securely mount a video display to a stationary object such as a wall, using a video display mounted via the VESA mount in a moving vehicle such as a car or a truck can create problems.

BRIEF SUMMARY

The ANTI-VIBRATION MOUNT FOR AN IN-VEHICLE VIDEO DISPLAY provides a convenient way to mount a video display in a vehicle that reduces vibration to enhance the viewing experience and eliminates the risk of damaging the mounting screw holes in the video display.

The constant vibration and bouncing caused by the movement of the vehicle can place significant stress on the screw interface between the VESA mount and the video display. Over time, this can loosen the screws that attach the video display to the VESA mount, or worse, can actually damage the video display housing so that it becomes impossible to secure the video display to the VESA mount. Also, the typical VESA mount secures to a relatively small area on the center back of the video display. In a moving vehicle, this can result in excessive vibration of the display device that can make an image on the display device difficult to view. For example, if a user is attempting to read a newspaper article, excessive vibration of the video display can make the text of the article difficult to read.

One general aspect of the invention is a support for holding a flat panel display device. The support includes: a base plate having a first side to mount against a support structure, and a second side opposite the first side; a first shaft guide and a second shaft guide attached to the second side of the base plate, the first shaft guide and the second shaft guide each having a hole to receive a corresponding securing member; a support shaft to slidably engage the first shaft guide and the second shaft guide, the support shaft having a plurality of shaft holes, wherein a shaft hole, of the plurality of shafts holes, overlaps each hole of the first shaft guide and the second shaft guide to receive the corresponding securing member to adjust a position of the support shaft with respect to the base plate; a support bar having a center portion attached to an end of the support shaft, so as to extend perpendicular to the support shaft, the support bar including a first end portion having a plurality of first support bar holes and a second end portion having a plurality of second support bar holes; a first bottom cradle arm having: a first bottom end portion to adjustably connect to the first end portion of the support bar via a selected first support bar hole of the plurality of first support bar holes, a first bottom support arm, connected to the first bottom end portion, extending perpendicular to the support bar to engage a bottom surface of the flat panel display, the first bottom support arm having a first bottom slot formed therein, and a first bottom hook portion, connected to the first bottom support arm, to engage a front surface of the flat panel display; a second bottom cradle arm having: a second bottom end portion to adjustably connect to the second end portion of the support bar via a selected second support bar hole of the plurality of second support bar holes, a second bottom support arm, connected to the second bottom end portion, extending perpendicular to the support bar to engage a bottom surface of the flat panel display, the second bottom support arm having a second bottom slot formed therein, and a second bottom hook portion, connected to the second bottom support arm, to engage a front surface of the flat panel display; a first bottom spacer to be slidably secured in the first bottom slot to contact a back surface of the flat panel display so that the flat panel display is secured between the first bottom hook portion and the first bottom spacer at a certain distance from the support shaft; a second bottom spacer to be slidably secured in the second bottom slot to contact a back surface of the flat panel display so that the flat panel display is secured between the second bottom hook portion and the second bottom spacer at the certain distance from the support shaft; a first top cradle arm having: a first vertical arm to adjustably connect to the base plate, a first top support arm, connected to the first vertical arm, extending perpendicular to the base plate to engage a top surface of the flat panel display, the first top support arm having a first top slot formed therein, and a first top hook portion, connected to the first top support arm, to engage a front surface of the flat panel display; a second top cradle arm having: a second vertical arm to adjustably connect to the base plate, a second top support arm, connected to the second vertical arm portion, extending perpendicular to the base plate to engage a top surface of the flat panel display, the second top support arm having a second top slot formed therein, and a second top hook portion, connected to the second top support arm, to engage a front surface of the flat panel display; a first top spacer to be slidably secured in the first top slot to contact a back surface of the flat panel display so that the flat panel display is secured between the first top hook portion and the first top spacer at the certain distance from the support shaft; a second top spacer to be slidably secured in the second top slot to contact a back surface of the flat panel display so that the flat panel display is secured between the second bottom hook portion and the second top spacer at the certain distance from the support shaft; a first side cradle arm having: a first horizontal arm having a plurality of first horizontal arm slots, wherein the first horizontal arm portion is to connect to the first vertical arm portion of the first top cradle arm via a selected first side slot of the plurality of first horizontal arm slots, a first side support arm, connected to the first horizontal arm, extending perpendicular to the base plate to engage a side surface of the flat panel display, and a first side hook portion, connected to the first side support arm, to engage a front surface of the flat panel display; and a second side cradle arm having: a second horizontal arm having a plurality of second horizontal arm slots, wherein the second horizontal arm portion is to connect to the second vertical arm of the second top cradle arm via a selected second side slot of the plurality of second horizontal arm slots, a second side support arm, connected to the second horizontal arm portion, extending perpendicular to the base plate to engage a side surface of the flat panel display, and a second side hook portion, connected to the second side support arm, to engage a front surface of the flat panel display.

In some implementations, the first bottom spacer, the second bottom spacer, the first top spacer, and the second top spacer, each have a protrusion to slidably engage a respective one of the first bottom slot, the second bottom, the first top slot, and the second top slot, and wherein the protrusion is to be secured in position via a tightening device.

In some implementations, the base plate further comprises: a horizontal flange portion extending perpendicular to the base plate, and a vertical flange portion connected to the horizontal flange portion and extending parallel to the base plate.

In some implementations, the horizontal flange portion defines an opening to receive the support shaft.

In some implementations, the vertical flange portion is to connect to the first vertical arm of the first top cradle arm and to the second vertical arm of the second top cradle arm.

In some implementations, the vertical flange portion includes a pair of spaced apart holes, wherein one hole, of the pair of spaced part holes, corresponds to a slot, of a pair of slots, of the first vertical arm of the first top cradle arm, and wherein another hole, of the pair of spaced part holes, corresponds to a slot, of a pair of slots, of the second vertical arm of the second top cradle arm.

In some implementations, a selected height of the first vertical arm is adjustable based on a selected slot, of the pair of slots, of the first vertical arm, and wherein a selected height of the second vertical arm is adjustable based on a selected slot, of the pair of slots, of the second vertical arm.

In some implementations, the first shaft guide, the second shaft guide, and the two holes to mount the base plate to the support structure are alternatively arranged along a vertical line of the base plate.

In some implementations, the first side support arm, of the first top cradle arm, is to connect to the first vertical arm via the selected first side slot and a corresponding hole in the first vertical arm, and wherein the second side support arm, of the second top cradle arm, is to connect to the second vertical arm via the selected second side slot and a corresponding hole in the second vertical arm.

In some implementations, a selected length of the first top cradle arm is adjustable based on the selected first side slot, and wherein a selected length of the second top cradle arm is adjustable based on the selected second side slot.

In some implementations, a selected width of the support bar is based on the selected support bar hole, of the plurality of first support bar holes and the selected support bar hole, of the plurality of second support bar holes.

One general aspect of the invention is a mount for supporting a display device. The mount includes: a base plate having at least one shaft guide; a pair of "L"-shaped top arms capable of moving with respect to the base plate and of being secured to the base plate at a selected position, the pair of "L"-shaped top arms to engage a top surface and a front surface of the display device; a pair of "L"-shaped side arms capable of moving with respect to the "L"-shaped top arms and of being secured to the "L"-shaped top arms at a selected position to engage a front surface and a side surface of the display device; a support shaft to engage the at least one shaft guides so that the support shaft is capable of moving through the at least one shaft guide and of being secured to the at least one shaft guide at a selected position; a support bar attached to an end of the support shaft and extending parallel to the pair of "L"-shaped side arms; and a pair of bottom support brackets capable of moving along the support bar and of being secured to the support bar at a selected position to engage a bottom surface and a front surface of the display device.

In some implementations, each "L"-shaped top arm, of the pair of "L"-shaped top arms, has a hook portion to engage the front surface of the display device.

In some implementations, the mount further comprises: a spacer mounted to each "L"-shaped top arm, of the pair of "L"-shaped top arms, wherein the spacer is capable of moving to engage a back surface of the display device to secure the display device against the hook portions.

In some implementations, each "L"-shaped top arm, of the pair of "L"-shaped top arms, has a plurality of vertically spaced openings, wherein a selected opening, of the plurality of vertically spaced openings, is to overlap a corresponding opening in the base plate to receive a fastener to secure a corresponding "L"-shaped top arm to the base plate.

In some implementations, each "L"-shaped side arm, of the pair of "L"-shaped side arms, has a plurality of horizontally spaced openings, wherein a selected opening, of the plurality of horizontally spaced openings, is to overlap a selected opening in a corresponding "L"-shaped top arm, of the pair of "L"-shaped top arms, to receive a fastener to secure a "L"-shaped side arm to the corresponding "L"-shaped top arm.

In some implementations, the support shaft includes a plurality of openings, wherein selected openings, of the plurality of openings, each correspond to an opening in the at least one shaft guide to receive a fastener to secure the base plate to the support shaft.

In some implementations, the support bar includes a plurality of openings, and wherein each bottom support bracket, of the pair of bottom support brackets, includes an end portion having an opening to overlap a selected opening, of the plurality of openings of the support bar, to receive a fastener to secure each of the bottom support brackets to the support bar.

In some implementations, each bottom support bracket, of the pair of bottom support brackets, has a hook portion to engage the front surface of the display device.

In some implementations, the mount further comprises: a spacer mounted to each bottom support bracket, of the pair bottom support brackets, wherein the spacer is capable of moving to engage a back surface of the display device to secure the display device against the hook portions.

Additional features, advantages, and implementations of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

FIGS. 7A and 7B are partial elevation views of the ANTI-VIBRATION MOUNT FOR AN IN-VEHICLE VIDEO DISPLAY of FIG. 1 mounting to a top of a video display.

FIGS. 8A and 8B are partial elevation views of the ANTI-VIBRATION MOUNT FOR AN IN-VEHICLE VIDEO DISPLAY of FIG. 1 mounting to a bottom of a video display.

DETAILED DESCRIPTION

Figure 1:
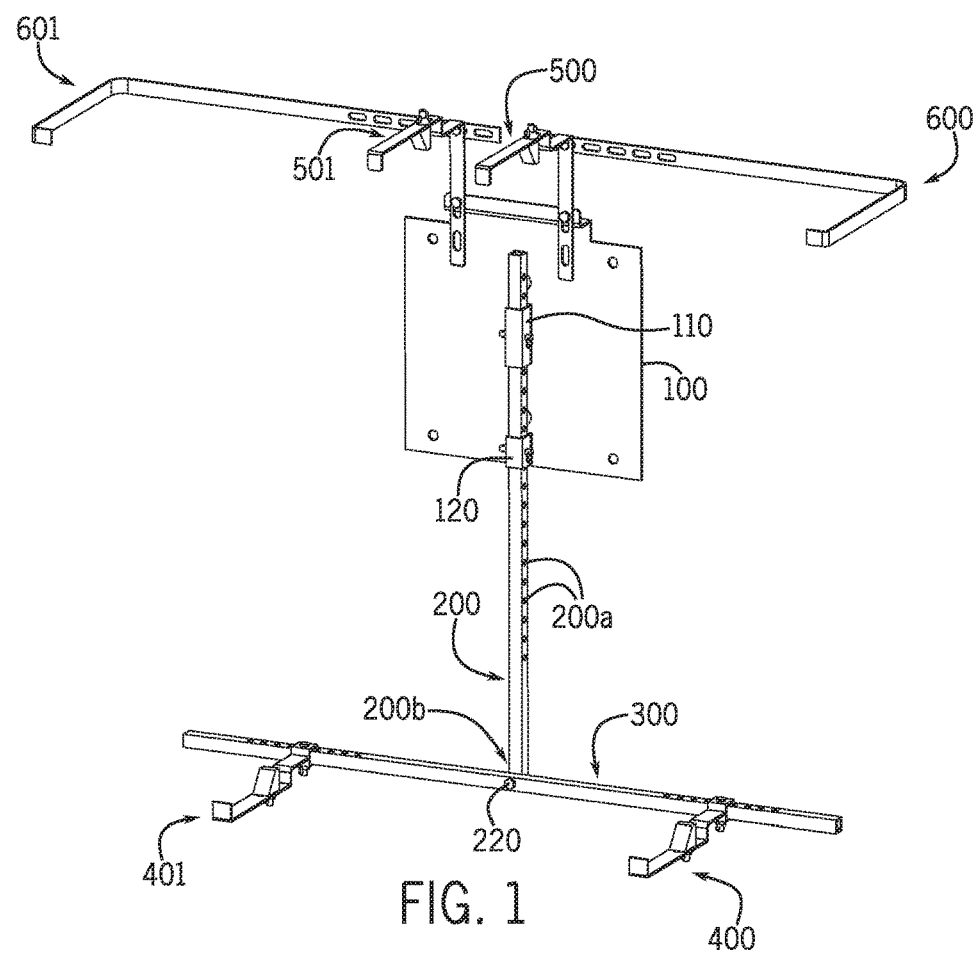
FIG. 1 is a perspective view of an exemplary implementation of the ANTI-VIBRATION MOUNT FOR AN IN-VEHICLE VIDEO DISPLAY.
Figure 2:
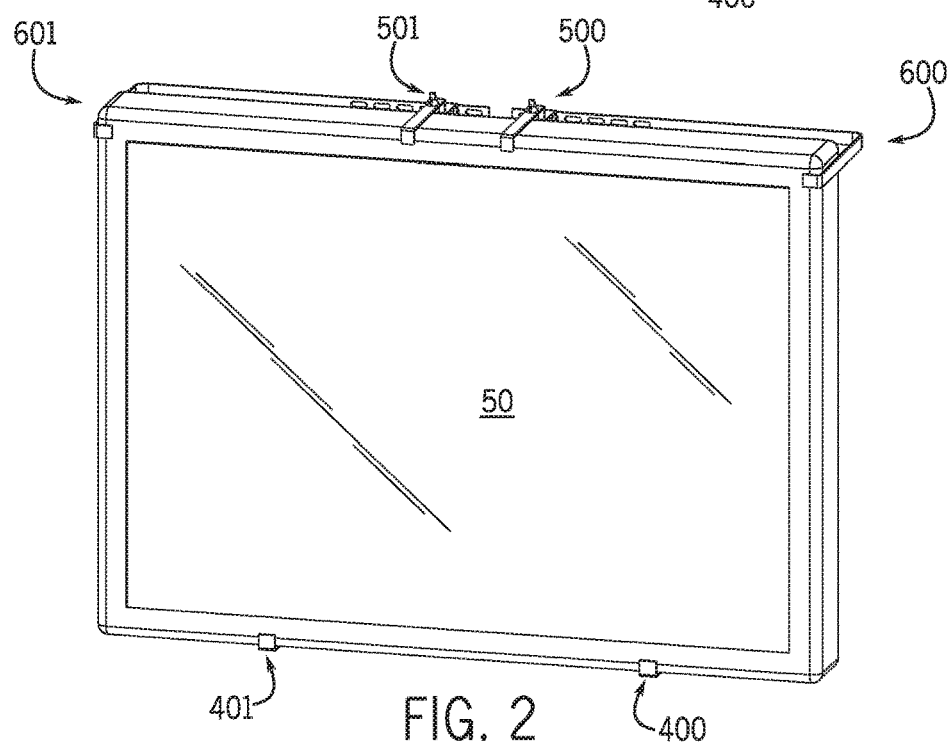
FIG. 2 is a front perspective view of the ANTI-VIBRATION MOUNT FOR AN IN-VEHICLE VIDEO DISPLAY of FIG. 1 supporting a video display.

FIGS. 1 and 2 are front perspective views of an exemplary implementation of the ANTI-VIBRATION MOUNT FOR AN IN-VEHICLE VIDEO DISPLAY that includes bottom cradle arms 400, 401, top cradle arms 500, 501, and side cradle arms 600, 601 that adjustably support a video display 50, that effectively eliminate the risk of damaging the mounting screw holes in a video display 50, and that reduce vibration of the video display 50 to enhance the viewing experience.

Figure 3:
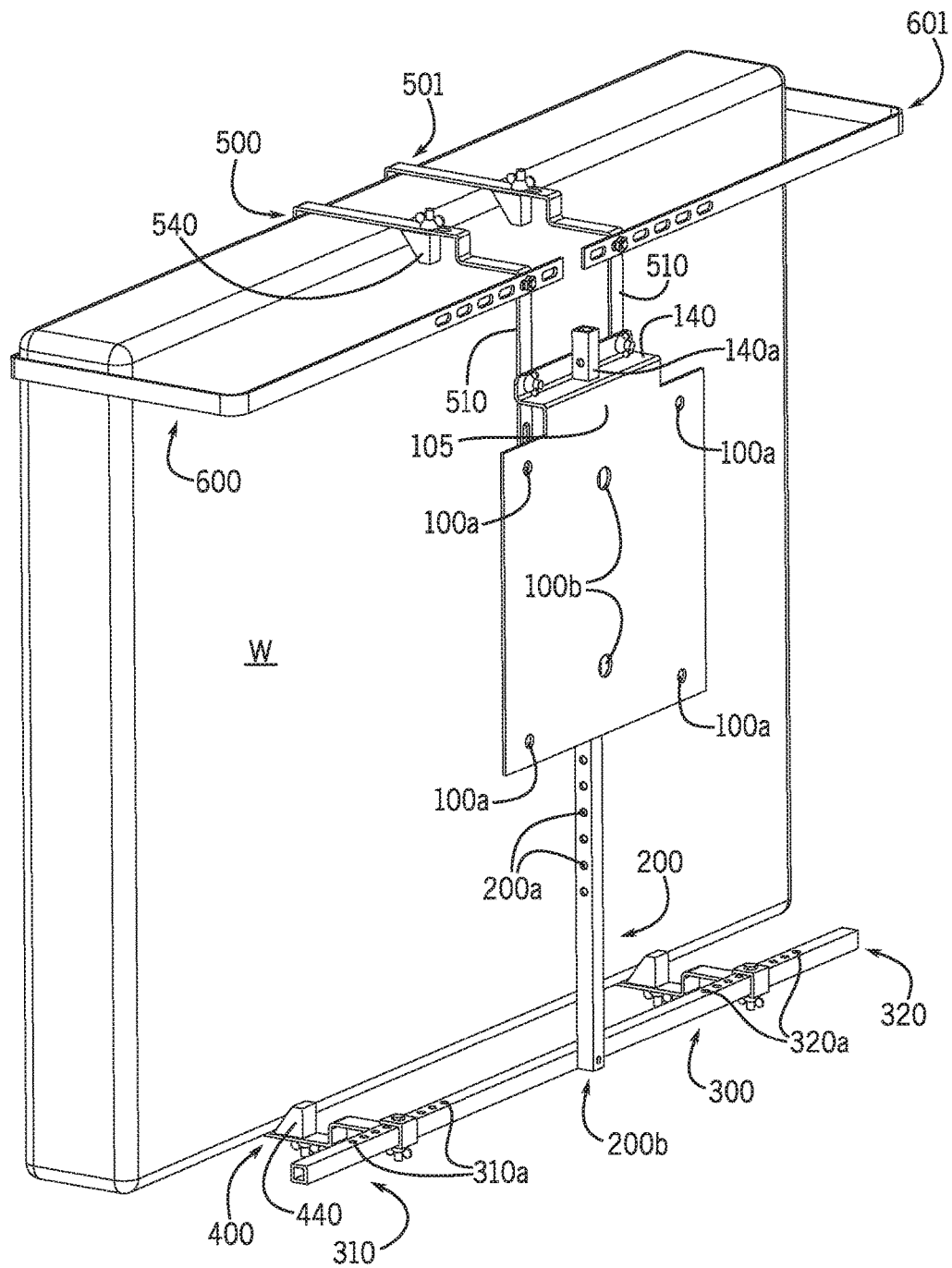
FIG. 3 is a rear perspective view of the ANTI-VIBRATION MOUNT FOR AN IN-VEHICLE VIDEO DISPLAY of FIG. 1 supporting a video display.
Figure 4:
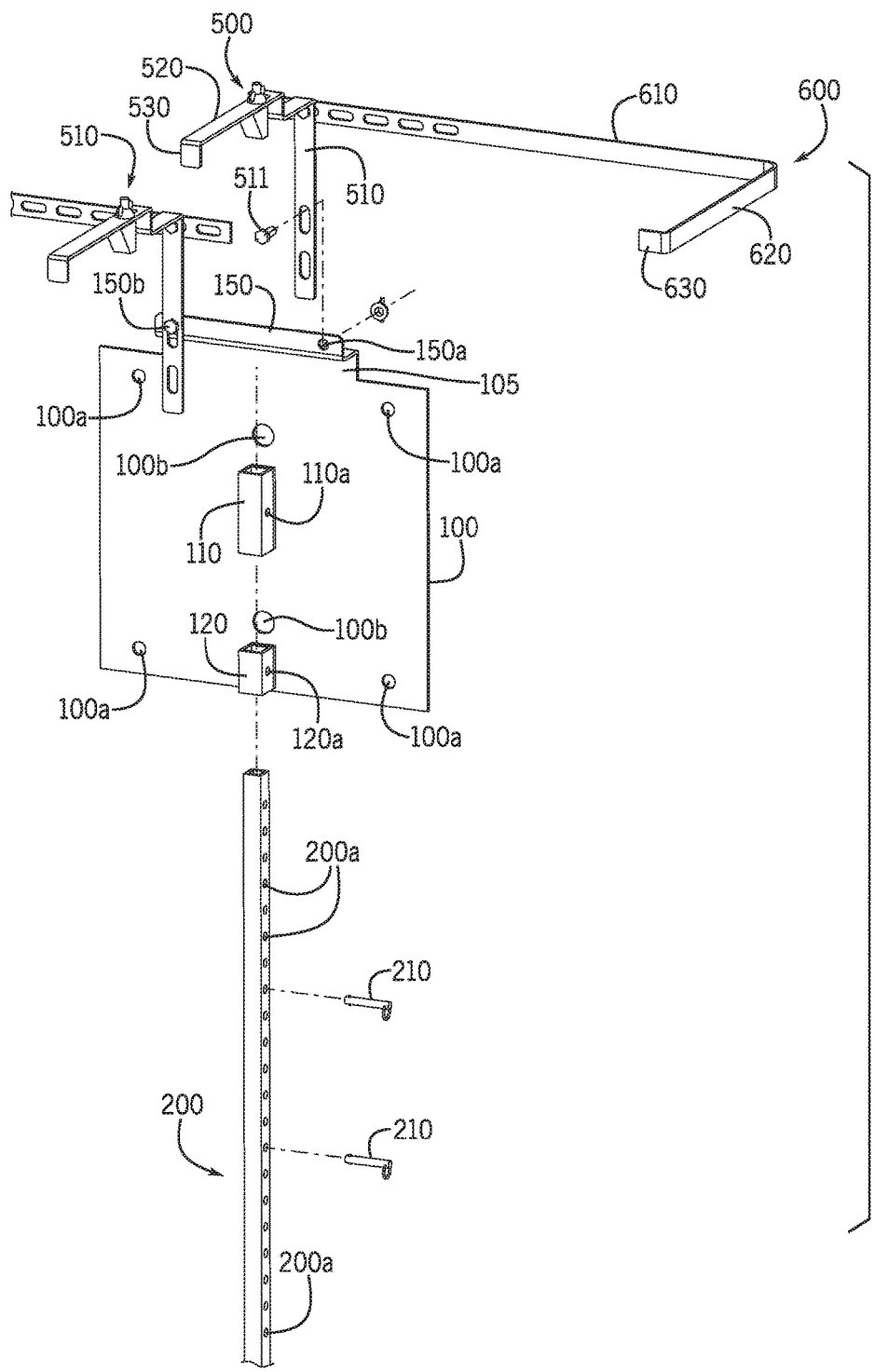
FIG. 4 is an exploded partial front view of a base plate and various components of the ANTI-VIBRATION MOUNT FOR AN IN-VEHICLE VIDEO DISPLAY of FIG. 1.

FIGS. 1, 3, and 4 show a base plate 100 of the ANTI-VIBRATION MOUNT FOR AN IN-VEHICLE VIDEO DISPLAY. As best shown in the exploded view of FIG. 4, the base plate 100 can have a generally square configuration with a protrusion 105 vertically extending from an upper portion of the base plate 100. In alternative exemplary implementations, the base plate may have a generally rectangular shape, and/or may lack the protrusion 105.

The base plate 100 includes a horizontal flange 140 extending from an upper portion of the base plate 100 in a direction toward video display 50. In the exemplary implementation having the protrusion 105 (as shown in FIGS. 1, 3, and 4), the horizontal flange 140 is connected to the protrusion 105. In the exemplary implementation without the protrusion 105, the horizontal flange 140 can be connected to an upper edge of the base plate 100. The horizontal flange 140 includes a horizontal flange opening 140a to receive a support shaft 200, as described below.

The base plate 100 further includes a vertical flange 150 vertically extending from horizontal flange 140. A first hole 150a and a second hole 150b are formed in the vertical flange 150 to connect the vertical flange 150 to first and second top cradle arms 500, 501, as described below.

Figure 9:
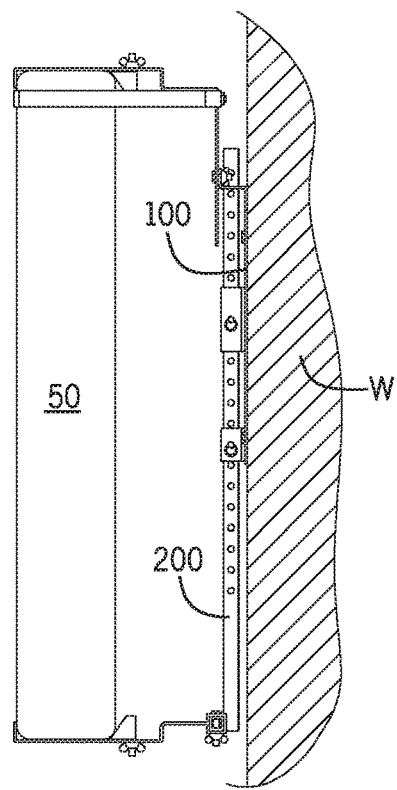
FIG. 9 is an elevation view of the ANTI-VIBRATION MOUNT FOR AN IN-VEHICLE VIDEO DISPLAY flush mounted to a surface.
Figure 10:
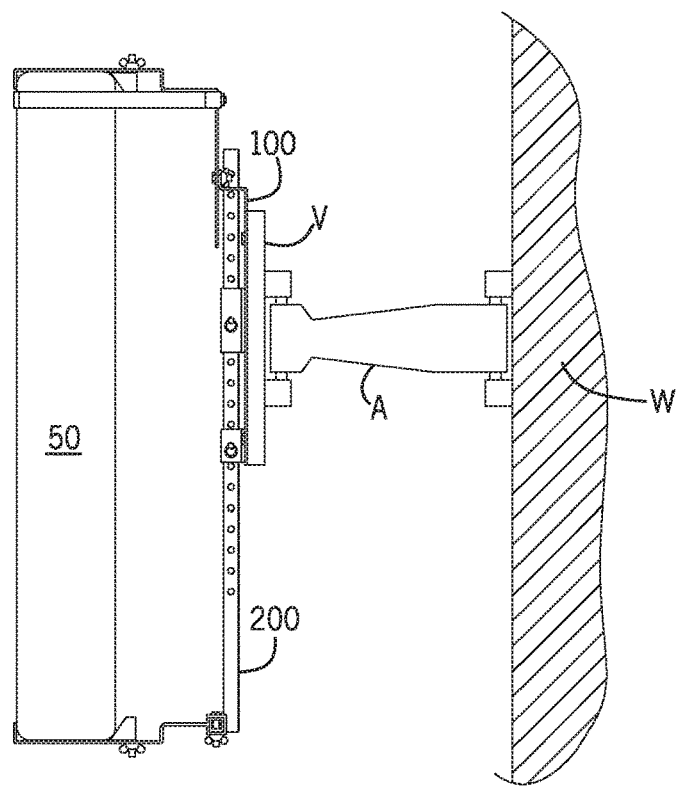
FIG. 10 is an elevation view of the ANTI-VIBRATION MOUNT FOR AN IN-VEHICLE VIDEO DISPLAY mounted to moveable arm.

The base plate 100 includes four mounting holes 100a that can be used to connect the base plate 100 to a standard VESA mount. For example, FIG. 10 shows the ANTI-VIBRATION MOUNT FOR AN IN-VEHICLE VIDEO DISPLAY connected to a VESA mount V of a swing arm A by the base plate 100. The base plate 100 also includes two mounting holes 100b that can be used to mount the base plate 100 to a flat surface that does not have a VESA mount. For example, FIG. 9 shows the ANTI-VIBRATION MOUNT FOR AN IN-VEHICLE VIDEO DISPLAY connected to a vehicle wall W by the base plate 100. Thus, via the two mounting holes 100b of the base plate 100, the ANTI-VIBRATION MOUNT FOR AN IN-VEHICLE VIDEO DISPLAY allows a video display 50 to be securely attached to a surface without using the mounting holes of the video display 50.

As best shown in FIG. 4, a first shaft guide 110 having at least one first shaft guide hole 110a and a second shaft guide 120 having at least one second shaft guide hole 120a are connected to the base plate 100. The first shaft guide 110 and the second shaft guide 120 are vertically aligned with horizontal flange opening 140a (FIG. 3).

A support shaft 200, having a plurality of support shaft holes 200a, is inserted through the first shaft guide 110, the second shaft guide 120 so that at least two selected support shaft holes, of the support shaft holes 200a, overlap the at least one first shaft guide hole 110a and the at least one second shaft guide hole 120a. If the support shaft 200 is inserted far enough through the first shaft guide 110 and the second shaft guide 120, the support shaft 200 will pass through the horizontal flange opening 140a (FIG. 3). As most clearly seen in FIG. 4, two support shaft securing members 210 are inserted through the overlapping holes 110a and 200a, 120a and 200a so that the support shaft 200 is secured in position with respect to the first shaft guide 110 and second shaft guide 120. In this way, the functional length of the support shaft 200 can be adjusted to accommodate video displays having different heights. The support shaft securing members 210 can be any suitable type of fastener such as, for example, a quick releasing locking pin, a Cotter pin, a spring-loaded lock pin, a detent pin, or bolt and nut.

As best shown in FIGS. 1 and 3, a support bar 300 is connected to the support shaft 200 by a support shaft mounting member 220 that passes through a support shaft mounting hole 200b formed in one end of the support shaft 200. The support bar 300 includes a first end portion 310 having a plurality of first support bar holes 310a and a second end portion 320 having a plurality of second support bar holes 320a.

Figure 6:
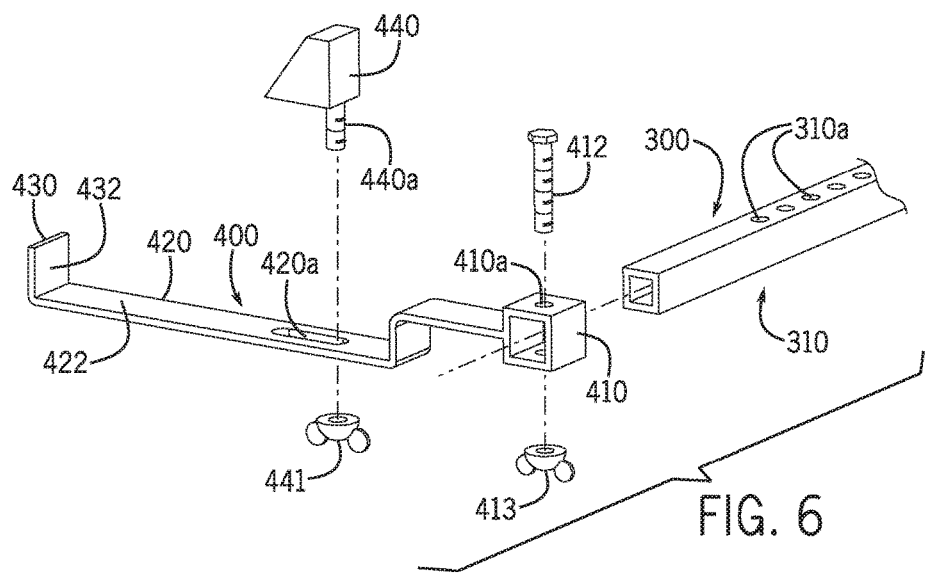
FIG. 6 is an exploded partial rear view of a support bar and various components of the ANTI-VIBRATION MOUNT FOR AN IN-VEHICLE VIDEO DISPLAY of FIG. 1.

As best shown in FIG. 6, a first bottom cradle arm 400 includes a bottom end portion 410 having a bottom end portion hole 410a, a bottom support arm 420 connected to the bottom end portion 410, and a generally "L"-shaped bottom hook portion 430 connected to the bottom support arm 420. The bottom end portion 410 slides over the first end portion 310 of the support bar 300 so that the bottom end portion hole 410a overlaps a selected support bar hole 310a. An end portion securing member 412 is inserted through the bottom end portion hole 410a and the selected support bar hole 310a to secure the first bottom cradle arm 400 to the support bar 300. FIG. 6 shows the end portion securing member 412 as a bolt that is secured with a wing nut 413. However, the end portion securing member 412 may be any fastening device capable of securing the first bottom cradle arm 400 to the support bar 300, such as, for example, a spring-loaded lock pin or Cotter pin.

A first bottom slot 420a is formed in the first bottom support arm 420 of the first bottom cradle arm 400. A first bottom spacer 440 has a protrusion 440a that slidably engages the first bottom slot 420a and is secured in a stationary position by a nut 441. As shown in FIGS. 8A and 8B, the first bottom spacer 440 can move along a length of the first bottom slot 420a (FIG. 6) to engage a rear surface of the video display 50. The first bottom spacer 440 can be secured in position by tightening the nut 441 to secure a front surface of the video display 50 pressed against the bottom hook portion 430.

The first bottom spacer 440 is preferably formed of a resilient material that will not damage the rear surface of the video display 50, and will isolate the video display from vibrations transmitted through the first bottom cradle arm 400. The resilient material may be, for example, include at least one of rubber, sorbothane, or cork.

Referring to FIG. 6, in an exemplary implementation, a mounting surface 422 of the first bottom support arm 420 that contacts a bottom surface of the video display 50, and a mounting surface 432 of the bottom hook portion 430 that contacts the front surface of the video display 50 can be covered with a resilient material that will not damage a surface of the video display 50, and will isolate the video display 50 from vibrations transmitted through the first bottom cradle arm 400. The resilient material may include, for example, at least one of rubber, sorbothane, or cork.

As shown in FIGS. 1 and 3, a second bottom cradle arm 401 is secured to a second end portion 320 of the support bar 300. The second bottom cradle arm 401 has the same components and functions in the same manner as the first bottom cradle arm 400.

Figure 5:
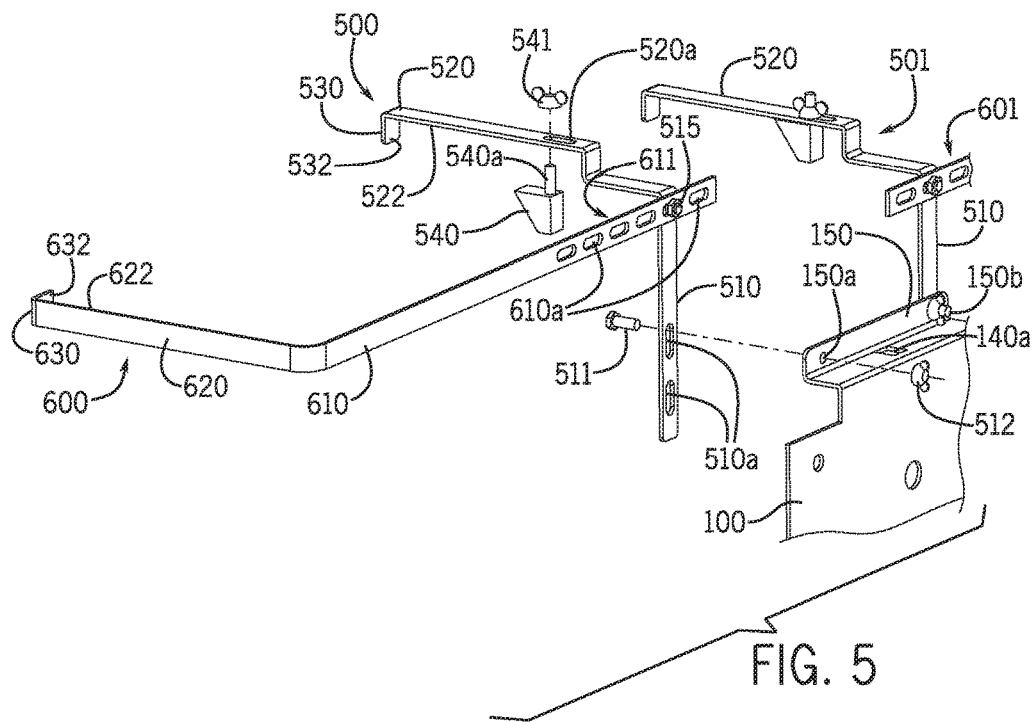
FIG. 5 is an exploded partial rear view of a base plate and various components of the ANTI-VIBRATION MOUNT FOR AN IN-VEHICLE VIDEO DISPLAY of FIG. 1.

As best seen in FIG. 5, a generally "L"-shaped first top cradle arm 500 includes a first vertical arm 510 having a plurality of first vertical arm slots 510a and a first mounting hole 515, a first top support arm 520 connected to the first vertical arm 510, and a generally "L"-shaped first top hook portion 530 connected to the first top support arm 520. The first vertical arm 510 is positioned so that a selected one of the plurality of first vertical arm slots 510a overlaps the first hole 150a in the vertical flange 150. A first vertical arm securing member 511 is inserted through the selected first vertical arm slot 510a and the first hole 150a to join the first vertical arm 510 to the vertical flange 150. In an exemplary implementation, the first vertical arm securing member 511 can be retained in position by a fastener, such as a wing nut 512. In another exemplary implementation, the first vertical arm securing member 511 can be of a type that does not require an additional fastener, such as, for example, a quick releasing locking pin, a Cotter pin, a spring-loaded lock pin, or a detent pin.

A functional length of the first vertical arm 510 can be selected based on which first vertical arm slot 510a is used to connect to the vertical flange 150. The use of the plurality of first vertical arm slots 510a in combination with the plurality of support shaft holes 200a allows for a more precise adjustment to accommodate video displays of different heights than would be possible with just the plurality of support shaft holes 200a. While FIG. 5 shows two first vertical arm slots 510a, it is noted that more vertical arm slots 510a may be used.

A first top slot 520a is formed in the first top support arm 520 of the first top cradle arm 500. A first top spacer 540 has a protrusion 540a that slidably engages the first top slot 520a and is secured in a stationary position by a nut 541. As shown in FIGS. 7A and 7B, the first top spacer 540 can move along a length of the first top slot 520a to engage a rear surface of the video display 50. The first top spacer 540 can be secured in position by tightening the nut 541 to secure a front surface of the video display 50 against the top hook portion 530.

The first top spacer 540 is preferably formed of a resilient material that will not damage the rear surface of the video display 50 and will isolate the video display from vibrations transmitted through the first top cradle arm 500. The resilient material may include, for example, at least one of rubber, sorbothane, or cork.

In an exemplary implementation, a downward-facing mounting surface 522 of the first top support arm 520 that contacts a top surface of the video display 50, and a rear-facing mounting surface 532 of the bottom hook portion 530 that contacts the front surface of the video display 50 can be covered with a resilient material that will not damage a surface of the video display 50 and will isolate the video display 50 from vibrations transmitted through the first top cradle arm 500. The resilient material may include, for example, at least one of rubber, sorbothane, or cork.

As shown in FIG. 1, a second top cradle arm 501 is secured to the vertical flange 150. The second top cradle arm 501 has the same components and functions in the same manner as the first top cradle arm 500.

As best shown in FIG. 5, a generally "L"-shaped first side cradle arm 600 includes a first horizontal arm arm 610 having a plurality of first side slots 610a, a first side support arm 620 connected to the first horizontal arm 610, and a generally "L"-shaped first side hook portion 630 connected to the first side support arm 620. The first horizontal arm 610 is positioned so that a selected one of the plurality of first horizontal arm slots 610a overlaps the first mounting hole 515 of the first vertical arm 510. A first horizontal arm securing member 611 is inserted through the selected first side slot 610a and the first mounting hole 515 to join the first horizontal arm 610 to the first vertical arm 510. In an exemplary implementation, the horizontal arm securing member 611 may be retained in position by a fastener, such as, for example, a nut (not shown). In another exemplary implementation, the horizontal arm securing member 611 can be of a type that does not require an additional fastener, such as, for example, a quick releasing locking pin, a Cotter pin, a spring-loaded lock pin, or a detent pin.

A functional length of the first horizontal arm 610 can be selected based on which of the plurality of first horizontal arm slots 610a is used to connect to the first vertical arm 510. Thus, video displays of different widths can be securely held. While FIG. 5 shows six first horizontal arm slots 610a, it is noted that more or less than six first horizontal arm slots 610a can be used.

In an exemplary implementation, an inward-facing mounting surface 622 of the first side support arm 620 that contacts a side surface of the video display 50, and a rear-facing mounting surface 632 of the side hook portion 630 that contacts the front surface of the video display 50 can be covered with a resilient material that will not damage a surface of the video display 50 and will isolate the video display 50 from vibrations transmitted through the first side cradle arm 500. The resilient material may include, for example, at least one of rubber, sorbothane, or cork.

As shown in FIG. 3, a second side cradle arm 601 is secured to a second vertical arm 510. The second side cradle arm 601 has the same components and functions in the same manner as the first side cradle arm 600.

In operation, the ANTI-VIBRATION MOUNT FOR AN IN-VEHICLE VIDEO DISPLAY holds a video display 50 without the use of the mounting holes of the video display. Thus, damage to the mounting holes of the video display caused by vibration can be eliminated. Also, due to the anti-vibration construction of the ANTI-VIBRATION MOUNT FOR AN IN-VEHICLE VIDEO DISPLAY, vibrations transmitted to the video display 50 can minimized, thereby improving readability of the display.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A support for holding a flat panel display device, the support comprising:
   a base plate having a first side to mount against a support structure, and a second side opposite the first side;
   a first shaft guide and a second shaft guide attached to the second side of the base plate, the first shaft guide and the second shaft guide each having a hole to receive a corresponding securing member;
   a support shaft to slidably engage the first shaft guide and the second shaft guide, the support shaft having a plurality of shaft holes, wherein a shaft hole, of the plurality of shafts holes, overlaps each hole of the first shaft guide and the second shaft guide to receive the corresponding securing member to adjust a position of the support shaft with respect to the base plate;
   a support bar having a center portion attached to an end of the support shaft, so as to extend perpendicular to the support shaft, the support bar including a first end portion having a plurality of first support bar holes and a second end portion having a plurality of second support bar holes;
   a first bottom cradle arm having:
   a first bottom end portion to adjustably connect to the first end portion of the support bar via a selected first support bar hole of the plurality of first support bar holes,
   a first bottom support arm, connected to the first bottom end portion, extending perpendicular to the support bar to engage a bottom surface of the flat panel display, the first bottom support arm having a first bottom slot formed therein, and
   a first bottom hook portion, connected to the first bottom support arm, to engage a front surface of the flat panel display;
   a second bottom cradle arm having:
   a second bottom end portion to adjustably connect to the second end portion of the support bar via a selected second support bar hole of the plurality of second support bar holes,
   a second bottom support arm, connected to the second bottom end portion, extending perpendicular to the support bar to engage a bottom surface of the flat panel display, the second bottom support arm having a second bottom slot formed therein, and
   a second bottom hook portion, connected to the second bottom support arm, to engage a front surface of the flat panel display;
   a first bottom spacer to be slidably secured in the first bottom slot to contact a back surface of the flat panel display so that the flat panel display is secured between the first bottom hook portion and the first bottom spacer at a certain distance from the support shaft;
   a second bottom spacer to be slidably secured in the second bottom slot to contact a back surface of the flat panel display so that the flat panel display is secured between the second bottom hook portion and the second bottom spacer at the certain distance from the support shaft;
   a first top cradle arm having:
   a first vertical arm to adjustably connect to the base plate,
   a first top support arm, connected to the first vertical arm, extending perpendicular to the base plate to engage a top surface of the flat panel display, the first top support arm having a first top slot formed therein, and
   a first top hook portion, connected to the first top support arm, to engage a front surface of the flat panel display;
   a second top cradle arm having:
   a second vertical arm to adjustably connect to the base plate,
   a second top support arm, connected to the second vertical arm portion, extending perpendicular to the base plate to engage a top surface of the flat panel display, the second top support arm having a second top slot formed therein, and
   a second top hook portion, connected to the second top support arm, to engage a front surface of the flat panel display;
   a first top spacer to be slidably secured in the first top slot to contact a back surface of the flat panel display so that the flat panel display is secured between the first top hook portion and the first top spacer at the certain distance from the support shaft;
   a second top spacer to be slidably secured in the second top slot to contact a back surface of the flat panel display so that the flat panel display is secured between the second bottom hook portion and the second top spacer at the certain distance from the support shaft;
   a first side cradle arm having:
   a first horizontal arm having a plurality of first horizontal arm slots, wherein the first horizontal arm portion is to connect to the first vertical arm portion of the first top cradle arm via a selected first side slot of the plurality of first horizontal arm slots,
   a first side support arm, connected to the first horizontal arm, extending perpendicular to the base plate to engage a side surface of the flat panel display, and
   a first side hook portion, connected to the first side support arm, to engage a front surface of the flat panel display; and
   a second side cradle arm having:
   a second horizontal arm having a plurality of second horizontal arm slots, wherein the second horizontal arm portion is to connect to the second vertical arm of the second top cradle arm via a selected second side slot of the plurality of second horizontal arm slots, a second side support arm, connected to the second horizontal arm portion, extending perpendicular to the base plate to engage a side surface of the flat panel display, and a second side hook portion, connected to the second side support arm, to engage a front surface of the flat panel display.

2. The support of claim 1, wherein the first bottom spacer, the second bottom spacer, the first top spacer, and the second top spacer, each have a protrusion to slidably engage a respective one of the first bottom slot, the second bottom slot, the first top slot, and the second top slot, and wherein the protrusion is to be secured in position via a tightening device.

3. The support of claim 1, wherein the base plate further comprises:

a horizontal flange portion extending perpendicular to the base plate, and a vertical flange portion connected to the horizontal flange portion and extending parallel to the base plate.

4. The support of claim 3, wherein the horizontal flange portion defines an opening to receive the support shaft.

5. The support of claim 3, wherein the vertical flange portion is configured to connect to the first vertical arm of the first top cradle arm and to the second vertical arm of the second top cradle arm.

6. The support of claim 5, wherein the vertical flange portion includes a pair of spaced apart holes, wherein one hole of the pair of spaced part holes corresponds to a slot of a pair of slots of the first vertical arm of the first top cradle arm, and wherein another hole of the pair of spaced part holes corresponds to a slot of a pair of slots of the second vertical arm of the second top cradle arm.

7. The support of claim 6, wherein a selected height of the first vertical arm is adjustable based on a selected slot of the pair of slots of the first vertical arm, and wherein a selected height of the second vertical arm is adjustable based on a selected slot of the pair of slots of the second vertical arm.

8. The support of claim 2, wherein the first shaft guide, the second shaft guide, and two holes to mount the base plate to the support structure are alternatively arranged along a vertical line of the base plate.

9. The support of claim 1, wherein the first side support arm, of the first top cradle arm, is to connect to the first vertical arm via the selected first side slot and a corresponding hole in the first vertical arm, and wherein the second side support arm, of the second top cradle arm, is to connect to the second vertical arm via the selected second side slot and a corresponding hole in the second vertical arm.

10. The support of claim 9, wherein a selected length of the first top cradle arm is adjustable based on the selected first side slot, and wherein a selected length of the second top cradle arm is adjustable based on the selected second side slot.

11. The support of claim 1, wherein a selected width of the support bar is based on the selected support bar hole, of the plurality of first support bar holes and the selected support bar hole, of the plurality of second support bar holes.

12. An anti-vibration mount for supporting a display device, the mount comprising:

a base plate having at least one shaft guide;

a pair of "L"-shaped top arms configured to move up and down with respect to the base plate and configured to be secured to the base plate at a selected position, the pair of "L"-shaped top arms also configured to engage a top surface and a front surface of the display device;

a pair of "L"-shaped side arms configured to move horizontally with respect to the "L"-shaped top arms and configured to be secured to the "L"-shaped top arms at a selected position to engage a front surface and a side surface of the display device;

a support shaft, in inserted relationship with the at least one shaft guide, and configured to be secured to the at least one shaft guide at a selected position;

a support bar attached to an end of the support shaft and extending parallel to the pair of "L"-shaped side arms; and a pair of bottom support brackets configured to move along the support bar and configured to be secured to the support bar at a selected position so as to engage a bottom surface and a front surface of the display device.

13. The mount of claim 12, wherein each "L"-shaped top arm, of the pair of "L"-shaped top arms, has a hook portion configured to engage the front surface of the display device.

14. The mount of claim 13, further comprising:

a spacer mounted to each "L"-shaped top arm, of the pair of "L"-shaped top arms, the spacer being configured to move so as to engage a back surface of the display device to secure the display device against the hook portions.

15. The mount of claim 12, wherein each "L"-shaped top arm, of the pair of "L"-shaped top arms, has a plurality of vertically spaced openings, a selected opening of the plurality of vertically spaced openings being configured to overlap a corresponding opening in the base plate so as to receive a fastener to secure a corresponding "L"-shaped top arm to the base plate.

16. The mount of claim 12, wherein each "L"-shaped side arm of the pair of "L"-shaped side arms has a plurality of horizontally spaced openings, a selected opening of the plurality of horizontally spaced openings being configured to overlap a selected opening in a corresponding "L"-shaped top arm of the pair of "L"-shaped top arms so as to receive a fastener to secure a "L"-shaped side arm to the corresponding "L"-shaped top arm.

17. The mount of claim 12, wherein the support shaft includes a plurality of openings, selected openings of the plurality of openings each corresponding to an opening in the at least one shaft guide so as to receive a fastener to secure the base plate to the support shaft.

18. The mount of claim 12, wherein the support bar includes a plurality of openings, and wherein each bottom support bracket of the pair of bottom support brackets includes an end portion having an opening to overlap a selected opening of the plurality of openings of the support bar so as to receive a fastener to secure each of the bottom support brackets to the support bar.

19. The mount of claim 12, wherein each bottom support bracket of the pair of bottom support brackets has a hook portion to engage the front surface of the display device.

20. The mount of claim 19, further comprising:

a spacer mounted to each bottom support bracket of the pair bottom support brackets, the spacer being configured to move so as to engage a back surface of the display device to secure the display device against the hook portions.

* * * * *